(No Model.)  5 Sheets—Sheet 1.

D. BRERETON.
STONE CUTTING MACHINE.

No. 370,119.  Patented Sept. 20, 1887.

WITNESSES
J. B. Johns
Wm. H. Brereton

INVENTOR
David Brereton
by Henry Wise Garnett,
Attorney (No Model.) 5 Sheets—Sheet 4.

D. BRERETON.
STONE CUTTING MACHINE.

No. 370,119. Patented Sept. 20, 1887.

WITNESSES
J. B. Johns
Wm. H. Brereton

INVENTOR
David Brereton
by Henry Wise Garnett
Attorney

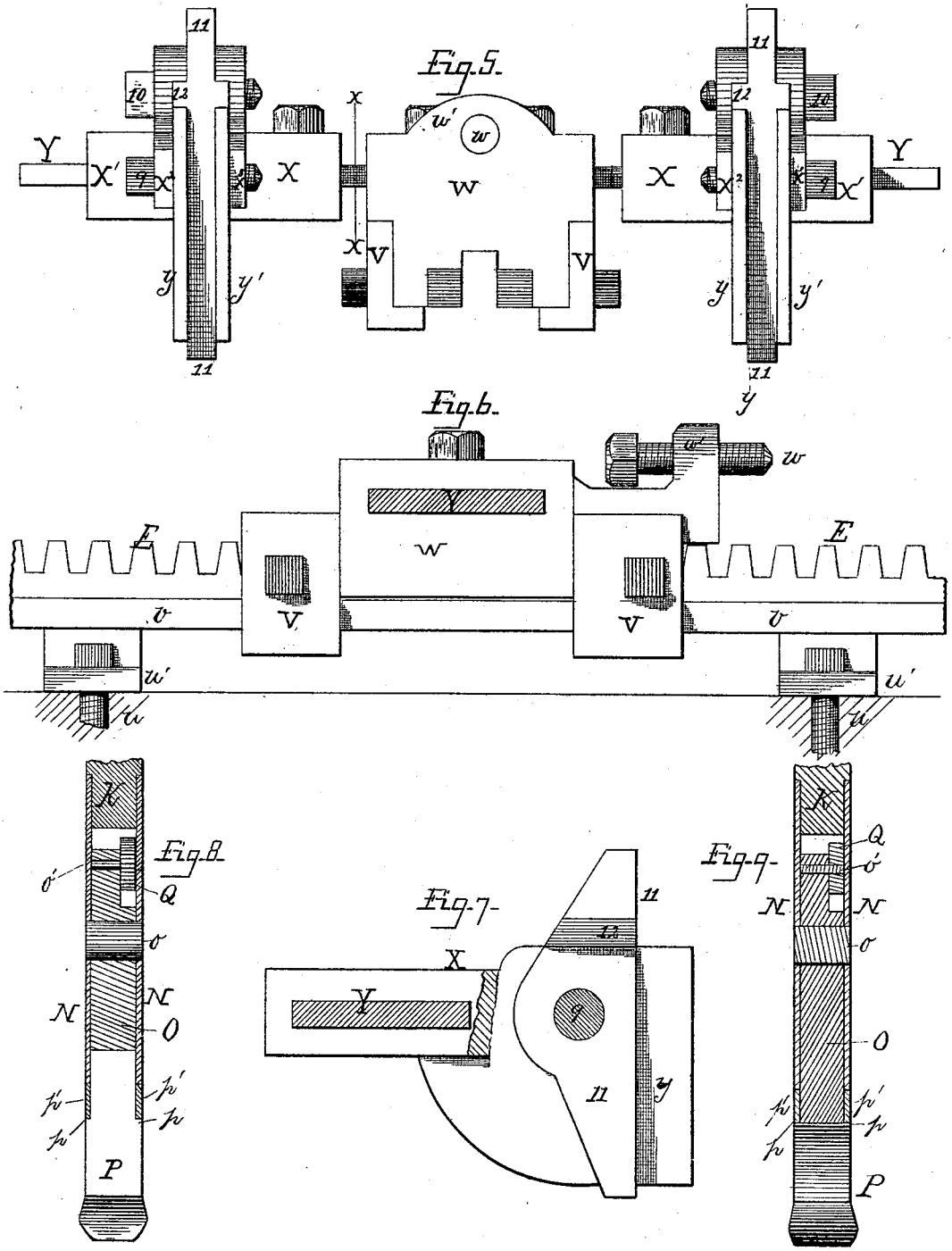

UNITED STATES PATENT OFFICE.

DAVID BRERETON, OF PHILADELPHIA, PENNSYLVANIA, ASSIGNOR TO WM. H. SHELMERDINE, OF SAME PLACE.

STONE-CUTTING MACHINE.

SPECIFICATION forming part of Letters Patent No. 370,119, dated September 20, 1887.

Application filed October 30, 1886. Serial No. 217,571. (No model.)

*To all whom it may concern:*

Be it known that I, DAVID BRERETON, a citizen of the United States, residing at Philadelphia, in the county of Philadelphia and State of Pennsylvania, have invented certain new and useful Improvements in Stone-Cutting Machines; and I do hereby declare the following to be a full, clear, and exact description of the invention, such as will enable others skilled in the art to which it appertains to make and use the same.

My invention relates to improvements in stone-cutting machinery, particularly that class of machines intended for use in quarrying stone or dividing the same into slabs of any desired dimensions, either while the stone is in its natural bed or after removal therefrom; and my said invention consists in certain details of construction and arrangement of the parts comprising the said machine, whereby to accomplish the desired result, as will be more fully described in the following specification, illustrated in the accompanying drawings, and form the subject-matter of the claims.

As now most generally practiced, the cutting of stone into slabs is performed by either reciprocating sand or rotary diamond-toothed saws which are mounted in frames that always remain in a fixed position relatively to the stone, or the stone is caused to move or feed to the saw, as in sawing timber-logs, whereas in this particular instance the stone always remains stationary and the entire machine, carrying the cutters and other operative parts of the same, is moved back and forth from end to end of the stone and effects the cutting through the medium of a series of fixed cutters or tools which are mounted at and project from the bottom edge of frames secured upon opposite sides of the machine, the movement of the machine back and forth being accomplished through the medium of an endless worm mounted within the machine-frame, which engages a rack fixed upon the face of the stone, whereby the cutters are brought in contact with and cut a channel in the stone somewhat similar to the operation of a planing-machine.

When constructing a machine in accordance with my invention, I proceed as follows, reference now being had to the accompanying drawings for a better understanding of the details of construction thereof, and in which drawings—

Figure 1:
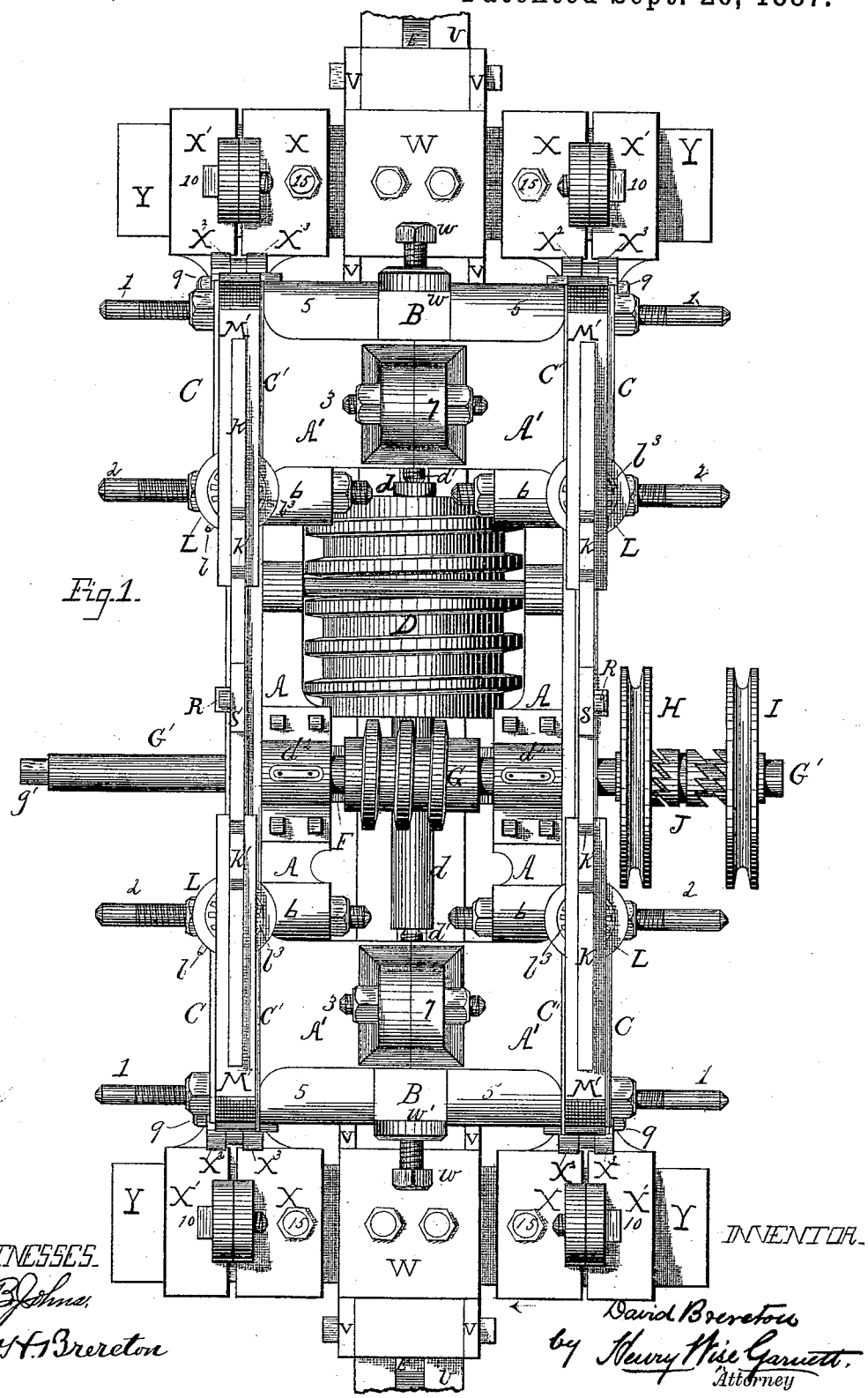
Figure 2:
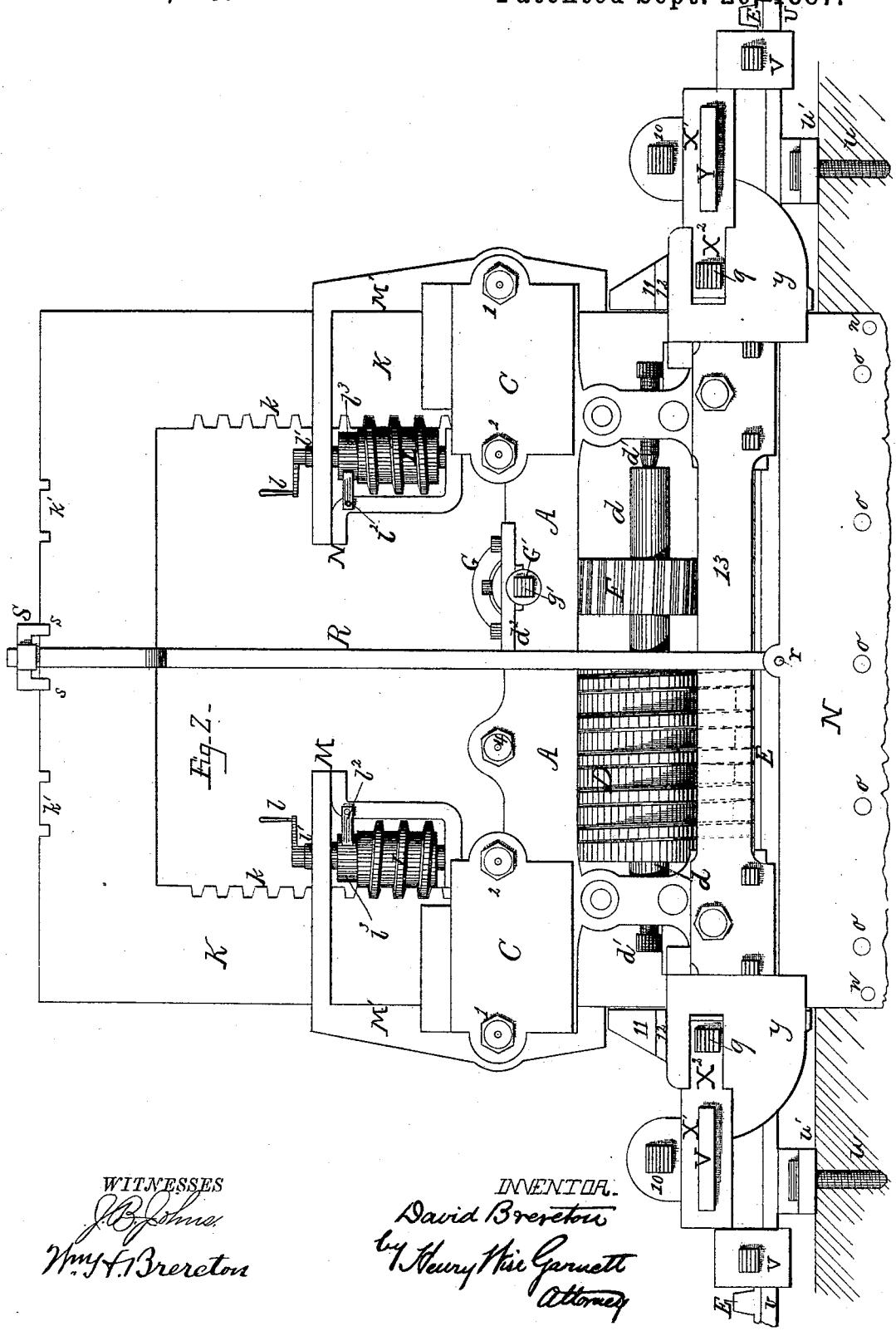
Figure 3:
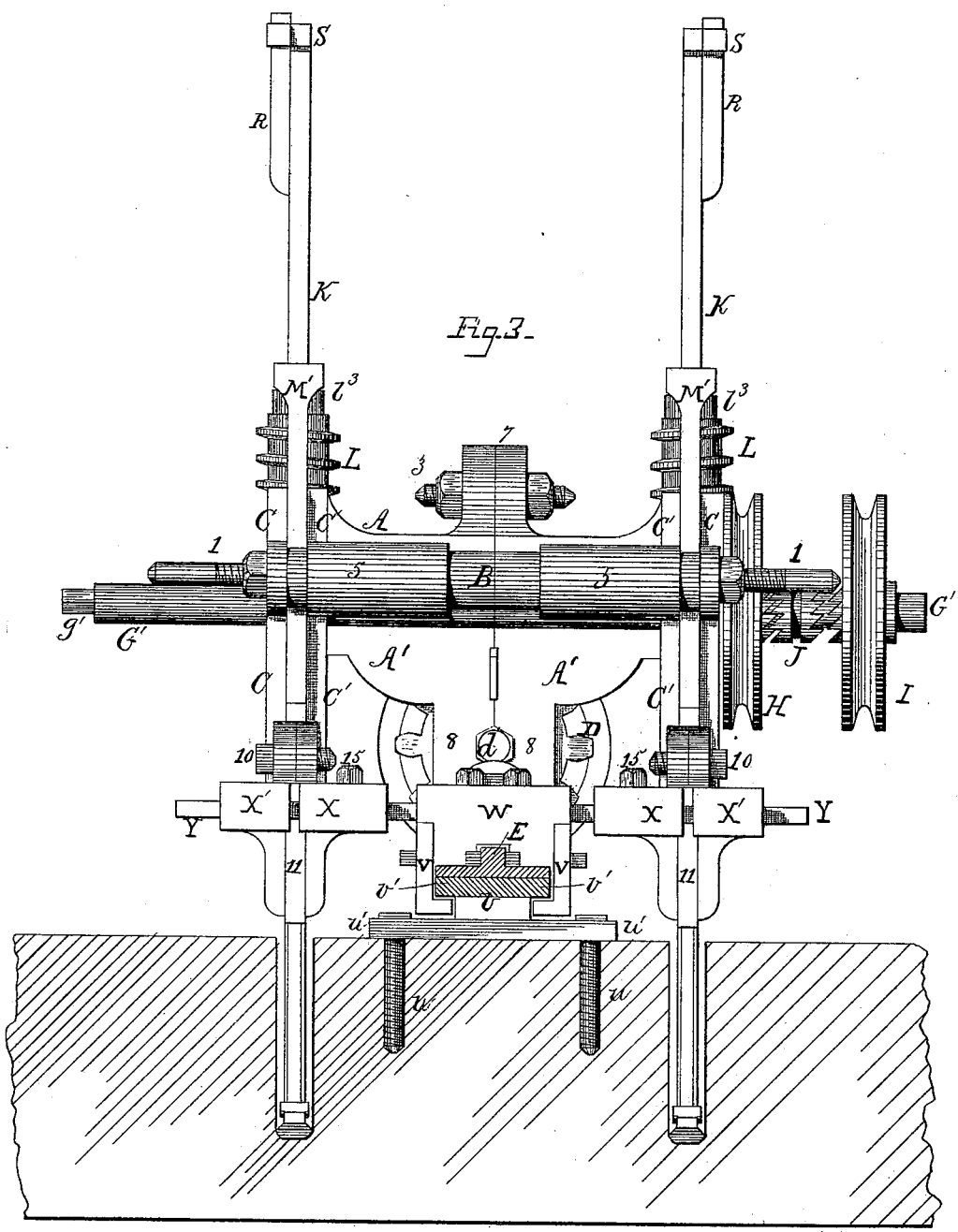
Figure 4:
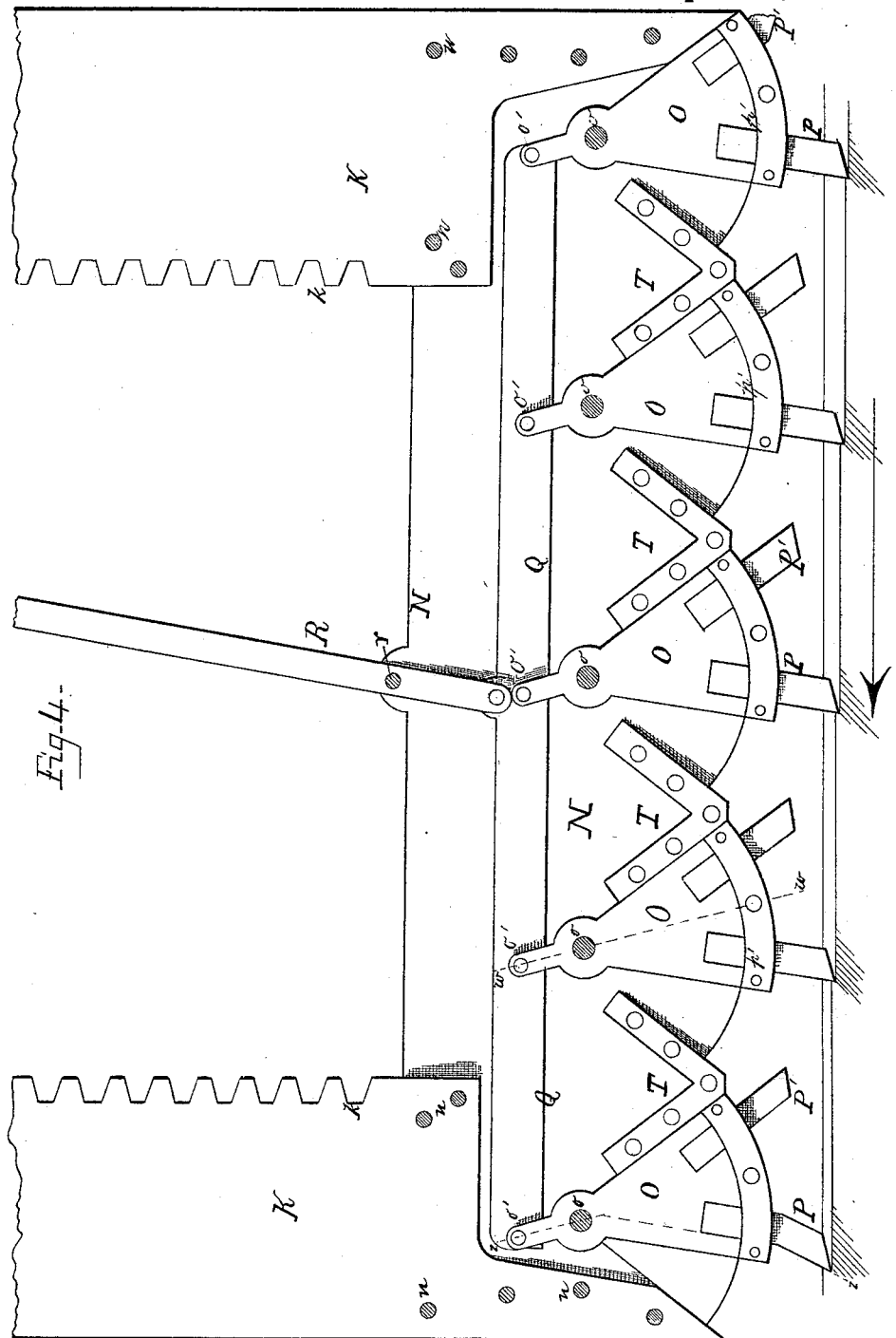

Figure 1 represents a plan view, Fig. 2 a side elevation, and Fig. 3 an end view, of a machine for quarrying stone constructed according to my invention. Fig. 4 represents a view in elevation and partial section of the tool-holder, showing the arrangement of the cutters in their holders and the holders in their supporting-frame, one of the side plates of the frame being removed and the cutters being shown in position ready for a cut in the direction of the arrow. Fig. 5 represents a detached face view of the guide-frame by which the machine is secured to the track and lateral vibration thereof prevented. Fig. 6 represents a transverse sectional elevation on the line $x\ x$ of Fig. 5, illustrating the central portion of the guide-frame in position upon the track; and Fig. 7 is a similar view on the line $y\ y$ of Fig. 5, illustrating the guide for the cutter-frame. Fig. 8 represents a vertical transverse section through the cutter-holder on the line $z\ z$ of Fig. 4, and Fig. 9 is a similar view on the line $w\ w$ of Fig. 4.

A A represent the main frame of the machine, which may be of cast-iron and of any suitable dimensions. This frame is in two parts of like contour, which are secured together by a series of bolts, 1 2 3 4, which pass through lugs 5 6 7 8, cast integral with the frames A. Each of the opposing bolts 1 1 at the ends of the machine are received at their inner ends into a nut, B, which nut abuts equally against the opposing faces of the lugs 5 5 of the frame, as shown in Figs. 1 and 3. All of these bolts are of sufficient length to permit of the adjustment of the nuts thereof, whereby the width of the machine may be increased for the purposes as will hereinafter appear, and upon the outside of the frame, at each end thereof, connecting the bolts 1 and 2, is a plate, C, opposite to which, upon the inner surface of the part A' of the frame A, is formed a smooth surface, C', of corresponding size to the plate C, for the purposes as will presently appear.

Longitudinally of the frame of the machine, and near the bottom thereof, is mounted a large endless worm, D, whose shaft $d$ has its bearings at each extremity upon center pins, $d'$, which pass through and are made adjustable for wear in a fixed part of the machine-frame. This worm D engages a rack, E, secured upon the face of the stone being cut, as seen in Figs. 2 and 3, and is the medium whereby the machine is propelled back and forth to effect the cutting of the stone. To operate this worm D, a smaller worm, as at F, is keyed to the shaft $d$, which meshes with a similar worm, G, on the driving-shaft G', which driving-shaft is journaled in bearings $d^2$ in the frame A and may be operated either by hand-power through a crank upon the end $g'$ or by belts from an engine passing around the pulleys H I, which are to be run in opposite directions to each other and between which a double clutch, J, is spline-keyed upon the shaft G', whereby the desired backward and forward movement of the machine is effected, when required, by a simple movement of said clutch without stopping the movement of the engine.

This completes the description of the machine and the means for propelling the same to effect the cutting of the stone, which cutting is accomplished by the following means and devices:

At each side of the frame A A, and between the plates C C' thereof, is arranged a rectangular frame, K, preferably of spring-steel and of any desired size and dimensions. Upon the inner edges of this frame K a rack, as at $k$, is formed, whereby, through the intervention of a worm, L, mounted in a bracket-support, M, secured to the main frame of the machine, the vertical adjustment of said frame K is effected by hand-crank $l$ upon the shaft $l'$ of the worm L, controlled by pawl $l^2$ and ratchet $l^3$. Each of these steel frames K is supplied with two worms L, which engage the racks $k$ upon the opposite inner edges of said frames, whereby the adjustment of one or both sides of the said frame may be effected for the purposes as will presently appear. At the bottom ends of these frames are mounted, between side plates, N, which are secured to said frames, as at $n$, Fig. 4, the cutter-holders O, within the lower ends of each of which holders are secured two tools or cutters, P P', which face in opposite directions to each other, whereby a cutting action is the result upon both movements of the machine. These cutter-holders, as shown in Fig. 4, consist of a segmental or arch-shaped body having a curved outer extremity and tapered sides, which converge toward the pivot $o$, upon which the holder is suspended and moves. Within slots formed in the curved ends of the holders O are received the cutters P P', which are formed with a shoulder, $p$, at each side thereof, which abuts against flanges $p'$, secured upon each side of the bottom edge of the holders O, as shown in Fig. 8, whereby lateral displacement of the cutters is prevented.

As before stated, each of the cutter-holders is mounted upon a pivot, $o$, which passes through and has its bearings in the side plates, N, secured at the bottom of frame K, and each of said cutter-holders is pivoted at its top extremity, as at $o'$, to a bar Q, at the center of which bar is pivoted a lever R, whose pivot-bearing is at $r$ in the side plates, N, of the frame K, and by means of which the adjustment or change of angularity of the tool-holders O is effected in order to bring one or the other of the cutters into action. As seen in Fig. 2, this hand-lever R extends upward to the top of the frame K, and at this end is supplied with a yoke, S, which slides thereon, and whose ends $s$ enter slots $k'$ in the frame K and hold the said lever in its adjusted position.

T T are stops or abutments formed upon or arranged between the plates N, upon which the tool-holders abut, thus relieving the pivots $o$ of said tool-holders of undue strain exerted upon them when the tools are in the operation of cutting.

In the machine here illustrated there are five cutter-holders, each of which is supplied with two cutters, so that when cutting five cutters upon each side of the machine will be in operation, which follow each other in line, but at a slightly greater depth one from the other, which is effected by a greater adjustment upon one side than upon the other of the frame K, and consequently each one of the five cutters upon each side of the machine is in action, and as many distinct bites in the stone is the result, so that, supposing each tooth to cut one-eighth of an inch deep, which is the usual cut of these cutters, the entire five cutters upon each side of the machine will upon each forward and backward movement of the machine cut a channel five-eighths of an inch deep.

To adjust the cutters in position, the worms L are operated by the hand-cranks $l$, which, through the engagement of said worms with the racks $k$ of the frame K, cause said frame to descend the proper distance, and by simply operating one worm a little more than the other the frame upon that particular side is adjusted to a greater degree than upon the opposite side. Therefore the points of the cutters will, commencing from the side of the frame which has been adjusted the slightest, each be projected slightly below the one in advance thereof, as shown in Fig. 4.

As before stated, the machine is caused to move back and forth across the stone by the rotation of the worm D, which engages in a rack, E, secured upon the stone. To secure this rack upon the stone, a track, as at U, is provided, to which the rack is fixed, and which track is by rock-bolts $u$ passed through lugs $u'$ of said track into the stone, as shown in Figs. 2, 3, and 6, rigidly fixed upon said stone. To secure the machine upon the track, and in such manner that separation or raising of the same from said track shall be prevented, the track is formed with flanges U', Fig. 3, at each side thereof, beneath which engage a series of clamps or angle-irons, V, secured to the frame of the machine, as well as upon what I term a "guide," situated at each extremity of the machine, and which I shall now proceed to describe in detail, as follows: This guide consists of a central or main part, W, Fig. 6, and two adjacent members, X, Fig. 7, all secured to and adapted to slide upon a bar, Y, which is of a greater length than the width of the machine, to provide for the adjustment of the members X relatively to the width of the said machine. To the main part W the clamps V are secured, which clamps, as before stated, engage beneath the flange U' of the track U, and thereby secure the extremities of the machine to said track. To secure the guide to the machine, a bolt, as at $w$, is employed, which passes through a lug, $w'$, formed on the body W, and enters a hole in the lower central part of the frame, as shown in Figs. 1 and 3. The side members, X, of the guide are secured to the main frame of the machine, at the bottom edge thereof, by a bolt, as at 9, and the lower edges of said members X come about flush with the surface of the stone, as seen in Fig. 3, so that vibration of the machine is prevented and it is held secure upon the track.

Referring more particularly to the members X of the guide, the same consist of two parts, X and X', through which the bar Y passes, secured to each other by a bolt, 10. A front extension, $X^2 X^3$, adjacent the machine-frame, is also supplied with a bolt, 9, by which the same is attached to the machine, as before stated. This front extension, $X^2 X^3$, of the part X X', through which the bolt 9 passes, has two side cheeks, $y y'$, cast integral therewith and extending slightly above and below the same, as shown in Fig. 7, between which cheeks is arranged, also upon the bolt 9 and in a vertical position, a plate, 11, whose front edge abuts against the outer vertical edge of the frame K and acts as a guide for the same. At the top of this guide 11, which, by the way, is of about equal thickness with the frame K, and upon each side thereof, are formed laterally-projecting flanges or shoulders 12, which rest upon the top edges of the side cheeks $y$, and thereby relieve the strain from the pivot-bolt 9. These members X of the guide, in addition to bracing and guiding the cutter-frame K at its lower edge, also act to steady the entire machine in its proper vertical position by coming against the surface of the stone. Thus the machine is securely braced and guided at each end and is held securely to the track through the main part W. In addition to this, the lateral spreading of the lower part of the machine-frame is prevented, because of the side members, X, embracing the frame K, being secured to the rigid transversely-arranged bar Y. To prevent the longitudinal displacement of the machine, braces, as at 13, Fig. 2, extend at each side from end to end of the machine, and thereby secure the same together. Thus it will be seen that both the lateral and longitudinal spreading of the machine are prevented.

The operation is as follows: The track is first secured in position upon the stone to be divided or cut into slabs or sections. The machine is then placed upon the track and secured thereto by the clamps V, any number of which may be employed at convenient positions along the machine-frame, as well as upon the main part W of the guide. The worms L are next operated to bring the cutter-frame K down in position, so that the tools P will project below the surface of the stone, the machine of course in its first position being at one extremity of the stone. These worms L are adjusted until a sufficient bite is given to the cutters, the worm upon one side being adjusted more than the opposite ones, so as to bring that side of the frame down slightly lower than the opposite side of the frame, the spring of the metal permitting this slight movement. When completing the movement of these worms L, the pawls $l^2$, engaging the ratchet-wheel $l^3$ on the shaft of said worm, will prevent the backward movement of said worms, and thus the frame K will be held in its adjusted position. The hand-lever R is next moved to either the right or left, as the case may be, so as to bring the tool-holders O against the stops T, and so hold them by the entrance of the ends of the yoke S within the slots $k'$ in the top edge of the frame K. Supposing this movement of the lever R to have been to the right, as here shown, the tool-holders O will be thrown to the left and the cutters P brought into action. Upon operating the shaft G', either by hand-power applied to a crank upon the end $g'$, or machine-power through bands over the right and left pulleys H I, the worm G is caused to move, which communicates motion to the large worm D through the worm F, and because of the engagement of said worm D with the rack E, fixed upon the track U, the entire machine, carrying the cutter-frames, is moved across the stone, bringing the cutters P into action and plowing two distinct channels into the face of the stone, each of which channels is five-eighths of an inch deep. This movement of the machine is continued until it reaches the extremity of the stone, when a reverse movement of the lever R changes the angularity of the tool-holders O and brings the teeth P' into proper position for a reverse cut. The frame K is now again lowered by the worms L, this time the opposite side of the frame to that that before received the greatest movement being lowered the greatest, so as to bring the teeth P' which were the highest in the first cut to the lowest position in the second cut. The cutters now being again set and adjusted, a reverse revolution of the drive-shaft G' causes the machine to again travel back over the track E and increase the depth of the channels in the stone. This forward and backward movement of the machine is continued until the stone is cut in two or the extremity of the movement of the frame K is reached. The track may be of any desired length, and the width apart of the cut or "slab" may be increased by adding plates or "washers" similar to the ones C upon the bolts 1 2 1 2, and adjacent the frame C' of the machine, so as to widen said frame to this extent and proportionally increase the distance apart of the cutter-frame K. When the width of the frame of the machine is so increased, the parts X of the guide must also be adjusted upon the bar Y relatively to the increased width of said frame, which is readily accomplished by removing the bolts 15, which secure said parts X to said bar Y, as shown in Figs. 1 and 5.

The bracket M, in addition to assisting in the support of the worm L, also acts as a brace to the top portion of the cutter-frame K, against which the rear portion, M', of said bracket impinges, as seen in Fig. 2.

Having thus described my invention, what I claim as new therein, and desire to secure by Letters Patent of the United States, is as follows, viz:

1. In a machine for cutting stone, the combination, with a suitable frame and a rack secured upon the face of the stone to be cut, of two vertically-adjustable cutter-frames carrying cutters at their lower extremities, arranged upon each side of the said machine-frame upon opposite sides of the rack, a worm mounted in said machine-frame and engaging the rack on the stone and moving the entire machine across the stone to effect the cutting thereof, and suitable means for adjusting the cutter-frames and operating the worm, whereby two distinct cuts or channels are made in the stone at each movement of the machine across the same.

2. In a machine for cutting stone, a suitable frame, the drive-shaft G', worm G, shaft $d$, worm F, and worm D, mounted in said frame, combined with a rack upon the face of the stone which engages the worm D, whereby the machine is moved across said stone, and suitable cutters attached to said machine-frame for cutting the stone as the machine is moved across the same.

3. In a machine for cutting stone, in combination with the rectangular cutter-frame K, carrying the cutters at their lower edge and formed along each of its inner vertical edges with racks $k\ k$, the worms L L, engaging said racks, bracket-supports M M' M M', pawls $l^2\ l^2$, ratchets $l^3\ l^3$, and cranks $l\ l$, whereby either one or both sides of each cutter-frame may be adjusted, for the purposes specified.

4. In a machine for cutting stone, in combination with the frame K, the side plates, N N, secured upon each side of the lower end of said frame, cutter-holders O, pivoted between said plates, bar Q, connecting the top ends of said cutter-holders, and lever R, pivoted to the plates N, substantially as described, for the purposes specified.

5. In a machine for cutting stone, in combination with the frame K, plates N N, secured upon each side of the lower end thereof, tool-holder O, pivoted between said plates, connecting-bar Q, and lever R, and the V-shaped stop T, secured to the plate N, substantially as described, for the purposes specified.

6. In a machine for cutting stone, in combination with said machine and track secured upon the face of the stone, the guide W $w'$, bar Y, clamps V, and bolt $w$, arranged at each extremity of the machine for securing the same to the track, substantially as described.

7. In a machine for cutting stone, in combination with the adjustable cutter-frame K and bar Y, the guide-frames X X', arranged upon said bar Y, and having a guide-plate, 11, pivoted between cheeks $y\ y'$ to form a guide for the cutter-frame, substantially as described.

8. In a machine for cutting stone, the combination, with a frame bearing the cutting-tools at its lower extremity, adapted to be vertically adjusted, of a series of cutter-holders, each bearing two oppositely-placed cutters, pivoted to said frame, with means for uniting said cutter-holders and simultaneously operating the same, whereby the entire series of said cutter-holders may be adjusted or swung on their pivot-bearing to bring either of the two tools held in said holder into position, for the purposes specified.

9. The combination, with a machine for cutting stone and a track secured upon the stone to be cut, having a rack, E, and flanges U', and worm mounted in said machine, engaging the rack and moving the machine, of the guides W, secured to a transverse bar, Y, at each extremity of the machine, with clamps V, engaging the flanged track, whereby the said machine is held secure to said track, and guides X X', also secured to the bar Y and to the machine-frame, whereby lateral displacement of said frame is prevented.

10. In a machine for cutting stone, in combination with the frame K, the plates N N, secured at the lower edge thereof, series of cutter-holders O, pivoted between said plates N, and having a curved outer extremity, within which the cutters are held, and converging sides, stops T, connecting-bar Q, and hand-lever R, substantially as described, for the purposes specified.

11. The combination, in a machine for cutting stone, with a suitable frame, of a cutter-frame adapted to be vertically adjusted upon both sides of the same, a series of cutter-holders pivoted to said frame and each bearing two oppositely-arranged cutters, means for vertically adjusting the cutter-frame, arranged to engage each side thereof, and each frame independent in its action of the other, and means for simultaneously operating the series of cutter-holders, whereby said cutter-holders may be adjusted to bring one set of cutters into play, the cutter-frame lowered upon both sides to take the next cut or bite, and still farther lowered upon one side only to bring each succeeding cutter lower than the first.

12. The combination, in a machine for cutting stone, with a rack secured upon the face of the stone to be cut, and a frame whose parts are capable of adjustment so as to increase the width of said machine, of two cutter-frames bearing cutters at their lower extremities, adapted to be vertically adjusted, and arranged at each side of said machine-frame upon opposite sides of the rack, a worm mounted in said machine-frame and engaging the rack upon the stone, and means for operating said worm and said cutter-frames, whereby two distinct cuts any desired distance apart may be made in the stone at each movement of the machine back and forth across the stone to produce slabs of different thicknesses.

13. In a machine for cutting stone, in combination with the frame A, suitably united by transverse bolts and the long bolts 1 2 1 2, the part A of the frame formed with a smooth surface, C', and detachable plates C, secured by the bolts 1 2, whereby the width of the machine may be increased, for the purposes specified.

14. In a machine for cutting stone, the segmental arch-shaped cutter-holders O, pivoted at o and having a curved outer edge with sockets for the cutter-tools therein, and side cheeks, $p'$, and cutting-tools P P', fitting within the sockets of the holders and having shoulders $p$, substantially as described, for the purposes specified.

DAVID BRERETON.

In presence of—
   JNO. PARRY,
   FRANK WARD.